US011532166B2

United States Patent
Li

(10) Patent No.: US 11,532,166 B2
(45) Date of Patent: Dec. 20, 2022

(54) OBSTACLE POSITIONING METHOD, DEVICE AND TERMINAL

(71) Applicant: Baidu Online Network Technology (Beijing) Co., Ltd, Beijing (CN)

(72) Inventor: Aowei Li, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 406 days.

(21) Appl. No.: 16/589,325

(22) Filed: Oct. 1, 2019

(65) Prior Publication Data

US 2020/0210724 A1 Jul. 2, 2020

(30) Foreign Application Priority Data

Dec. 28, 2018 (CN) .......................... 201811628751.2

(51) Int. Cl.
*G06V 20/58* (2022.01)
*B60Q 9/00* (2006.01)
*G01C 21/00* (2006.01)

(52) U.S. Cl.
CPC ............. *G06V 20/58* (2022.01); *B60Q 9/008* (2013.01); *G01C 21/005* (2013.01); *G06T 2207/30261* (2013.01)

(58) Field of Classification Search
CPC .......... B60Q 9/00; B60Q 9/008; G01C 21/00; G01C 21/005; G01S 13/00; G01S 13/87;
(Continued)

(56) References Cited

U.S. PATENT DOCUMENTS 9,910,149 B2 * 3/2018 Pampus ............. B62D 15/0285
2013/0162461 A1   6/2013 Lucking et al.
(Continued)

FOREIGN PATENT DOCUMENTS

CN   102385056 B   3/2012
CN   103048661 A   4/2013
(Continued)

OTHER PUBLICATIONS

Office Action dated Oct. 7, 2021 issued in connection with corresponding European Patent Application No. 19200638.5.
(Continued)

*Primary Examiner* — Charles J Han
(74) *Attorney, Agent, or Firm* — Akerman LLP

(57) ABSTRACT

An obstacle positioning method, device and terminal are provided. The method includes determining installation positions of at least two detectors on a vehicle, and respective detection areas of the detectors, determining an overlapping area of the detection areas of the detectors, and if determining that an obstacle is located in the overlapping area, determining a position of the obstacle according to the installation positions of the detectors forming the overlapping area. By changing the number and positions of detectors installed on an unmanned vehicle, a plurality of overlapping areas of the detection areas of the detectors are obtained, the distribution of obstacles around the vehicle are optimally identified, so that the unmanned vehicle makes reasonable driving plans based on an accurate surrounding obstacle environment.

5 Claims, 6 Drawing Sheets

(58) Field of Classification Search
CPC ........ G01S 13/878; G01S 13/88; G01S 13/93;
G01S 13/931; G01S 15/00; G01S 15/87;
G01S 15/876; G01S 15/88; G01S 15/93;
G01S 15/931; G01S 17/00; G01S 17/02;
G01S 17/06; G01S 17/87; G01S 17/88;
G01S 17/93; G01S 17/931; G01S
2013/9323; G01S 2013/9324; G01S
2013/9327; G01S 2013/93271; G01S
2013/93272; G01S 2015/937; G06K 9/00;
G06K 9/00624; G06K 9/00791; G06K
9/00805; G06T 2207/00; G06T 2207/30;
G06T 2207/30248; G06T 2207/30252
See application file for complete search history.

(56) References Cited

U.S. PATENT DOCUMENTS

| | | |
|---|---|---|
| 2017/0176594 A1 | 6/2017 | Ichikawa et al. |
| 2017/0311228 A1 | 10/2017 | Zavesky et al. |

FOREIGN PATENT DOCUMENTS

| | | | |
|---|---|---|---|
| CN | 104318782 A | | 1/2015 |
| CN | 104469170 A | | 3/2015 |
| CN | 106405560 A | | 2/2017 |
| CN | 107065871 A | | 8/2017 |
| CN | 108592885 A | | 9/2018 |
| CN | 108646250 A | | 10/2018 |
| CN | 108733041 A | | 11/2018 |
| JP | 2007265451 A | | 10/2007 |
| JP | 2016060239 A | | 4/2016 |
| KR | 20170077314 A | * | 7/2017 |
| KR | 20170077314 A | | 7/2017 |

OTHER PUBLICATIONS

Extended European Search Report issued in connection with European Patent Application No. 19200638.5.
Notification to Grant Patent Right for Invention dated Feb. 11, 2022 issued in connection with Chinese Patent Application No. 2018116287512.

* cited by examiner

OBSTACLE POSITIONING METHOD, DEVICE AND TERMINAL

CROSS-REFERENCE TO RELATED APPLICATION

This application claims priority to Chinese Patent Application No. 201811628751.2, filed on Dec. 28, 2018, which is hereby incorporated by reference in its entirety.

TECHNICAL FIELD

The present application relates to the field of automatic driving technology, and in particular, to an obstacle positioning method, device and terminal.

BACKGROUNDS

At present, ultrasonic detector is increasingly used in the field of automatic driving. Some vehicles have been provided with the ultrasonic detector. By applying a distance measurement function of the ultrasonic detector, obstacles such as people, and vehicles can be identified, and a panoramic observation on the periphery can further be achieved. By using the ultrasonic detector, a distance between an obstacle and an unmanned vehicle can be determined and feedback effectively. However, in the existing ultrasonic obstacle positioning method, the detection effect and efficiency of the obstacle is improved by only improving the performance characteristics and the installation manner of a single ultrasonic detector. In this way, the detection results are not accurate enough or sufficient to obtain relative coordinates between an obstacle and the vehicle, so that an accurate positioning of the obstacle cannot be obtained, and obstacle environment of a vehicle cannot be modeled. Therefore, there is a need for an improved obstacle positioning method, which allows an unmanned vehicle to make reasonable driving plans based on an accurate surrounding obstacle environment.

SUMMARY

An obstacle positioning method, device and terminal are provided according to embodiments of the present application, so as to at least solve the above technical problems in the existing technology.

In a first aspect, an obstacle positioning method is provided according to an embodiment of the present application. The method includes determining installation positions of at least two detectors on a vehicle, and respective detection areas of the detectors, determining an overlapping area of the detection areas of the detectors, if determining that an obstacle is located in the overlapping area, determining a position of the obstacle according to the installation positions of the detectors forming the overlapping area.

In an implementation, the determining an overlapping area of the detection areas of the detectors includes depicting a body frame according to a contour of the vehicle, and marking the detectors in the body frame, establishing a coordinate system with a middle point of a rear axle of the vehicle as an origin, determining boundary coordinates of the detection areas of the detectors in the established coordinate system, and determining the overlapping area according to the boundary coordinates of the detection areas of the detectors.

In an implementation, the determining a position of the obstacle according to the installation positions of the detectors forming the overlapping area includes calculating, in the coordinate system, coordinates of the installation positions of the detectors associated with the overlapping area, and calculating coordinates of the positions of the obstacles, based on the coordinates of the installation positions of the associated detectors, a distance between the associated detectors, and a distance between each of the associated detectors and the obstacle.

In an implementation, the method further includes determining at least one non-overlapping area of the detection areas of the detectors according to the overlapping area and the respective detection areas of the detectors, if determining that the obstacle is located in a non-overlapping area, determining the non-overlapping area in which the obstacle is located, as a position area of the obstacle.

In a second aspect, an obstacle positioning device is provided according to an embodiment of the present application. The device includes at least two detectors installed on a vehicle, wherein each detector has a detection area, an overlapping area determination module, configured to determine installation positions of the at least two detectors, and respective detection areas of the detectors, and to determine an overlapping area of the detection areas of the detectors, and an obstacle positioning module, configured to determine a position of an obstacle according to the installation positions of the detectors forming the overlapping area, if it is determined that the obstacle is located in the overlapping area.

In an implementation, the overlapping area determination module includes a vehicle frame depicting unit, configured to depict a body frame according to a contour of the vehicle, and mark the detectors in the body frame, a detection area boundary coordinate calculation unit, configured to establish a coordinate system with a middle point of a rear axle of the vehicle as an origin, and determine boundary coordinates of the detection areas of the detectors in the established coordinate system, and an overlapping area determination unit, configured to determine the overlapping area according to the boundary coordinates of the detection areas of the detectors.

In an implementation, the obstacle positioning module includes a detector coordinate calculation unit, configured to calculate, in the coordinate system, coordinates of the installation positions of the detectors associated with the overlapping area, and an obstacle position calculation unit, configured to calculate coordinates of the position of the obstacle, based on the coordinates of the installation positions of the associated detectors, a distance between the associated detectors, and a distance between each of the detectors and the obstacle.

In an implementation, the device further includes an obstacle in a non-overlapping area positioning module, configured to determine at least one non-overlapping area of the detection areas of the detectors according to the overlapping area and the respective detection areas of the detectors, and if it is determined that the obstacle is located in a non-overlapping area, determine the non-overlapping area in which the obstacle is located, as a position area of the obstacle.

In a third aspect, an obstacle positioning terminal is provided according to embodiments of the present application. The functions may be implemented by using hardware or by corresponding software executed by hardware. The hardware or software includes one or more modules corresponding to the above functions.

In a possible design, the obstacle positioning terminal structurally includes a processor and a memory, wherein the memory is configured to store programs which support the obstacle positioning terminal in executing the obstacle positioning method in the first aspect. The processor is configured to execute the programs stored in the memory. The obstacle positioning terminal may further include a communication interface through which the obstacle positioning terminal communicates with other devices or communication networks.

In a fourth aspect, a computer-readable storage medium for storing computer software instructions used for an obstacle positioning device is provided. The computer readable storage medium may include programs involved in executing the obstacle positioning method described above in the first aspect.

One of the above technical solutions has the following advantages or beneficial effects: at least two detectors are installed on a vehicle, wherein each detector has a detection area. If it is determined that an obstacle is located in an overlapping area of the detection areas of the detectors, a coordinate system is established and coordinates of the installation positions of the detectors associated with the overlapping area are calculated. Then, coordinates of the position of the obstacle are calculated based on the coordinates of the installation positions of the associated detectors, a distance between the associated detectors, and a distance between each of the detectors and the obstacle, so that a precise positioning of an obstacle is achieved. If it is determined that an obstacle is located in a non-overlapping area of the detection areas of the detectors, the non-overlapping area in which the obstacle is located, is determined as a position area of the obstacle. By changing the number and the positions of detectors installed on an unmanned vehicle, a plurality of overlapping areas of detection areas of detectors are obtained, the distribution of obstacles around the vehicle can be optimally identified, so that the unmanned vehicle can make reasonable driving plans based on an accurate surrounding obstacle environment.

The above summary is provided only for illustration and is not intended to be limiting in any way. In addition to the illustrative aspects, embodiments, and features described above, further aspects, embodiments, and features of the present application will be readily understood from the following detailed description with reference to the accompanying drawings.

BRIEF DESCRIPTION OF THE DRAWINGS

In the drawings, unless otherwise specified, identical or similar parts or elements are denoted by identical reference numerals throughout the drawings. The drawings are not necessarily drawn to scale. It should be understood these drawings merely illustrate some embodiments of the present application and should not be construed as limiting the scope of the present application.

DETAILED DESCRIPTION OF THE EMBODIMENTS

Hereafter, only certain exemplary embodiments are briefly described. As can be appreciated by those skilled in the art, the described embodiments may be modified in different ways, without departing from the spirit or scope of the present application. Accordingly, the drawings and the description should be considered as illustrative in nature instead of being restrictive.

Embodiment I

Figure 1:
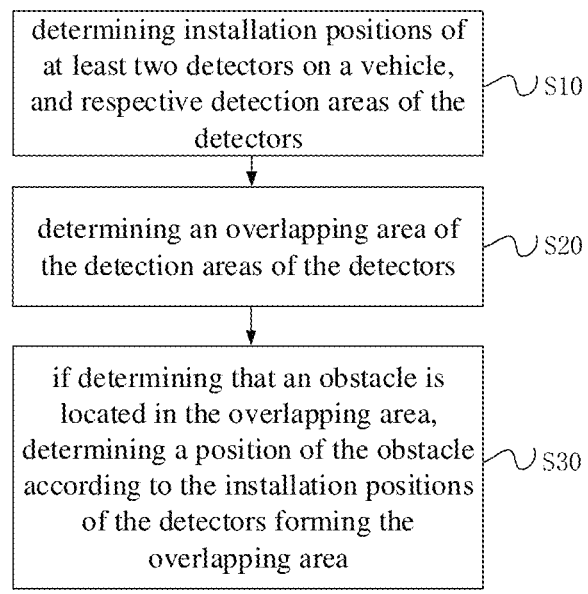
FIG. 1 is a flowchart showing an obstacle positioning method according to an embodiment.

As shown in FIG. 1, in an implementation, an obstacle positioning method is provided. The method may include determining installation positions of at least two detectors on a vehicle, and respective detection areas of the detectors at S10, determining an overlapping area of the detection areas of the detectors at S20, if determining that an obstacle is located in the overlapping area, determining a position of the obstacle according to the installation positions of the detectors forming the overlapping area at S30.

In an example, the detectors may be installed in different positions, such as at a front of the vehicle, at a rear of the vehicle, or at a side of the vehicle. A perfect ultrasonic coverage and detection effect may be provided by providing the detectors on both sides at the front of a vehicle. The detectors can detect obstacles located in the detection areas. There are various types of detectors, such as an ultrasonic detector, an infrared laser detector, and the like. All detectors capable of detecting obstacles, fall into the protection scope of the present embodiment. In the present embodiment, an ultrasonic signal is transmitted by the ultrasonic detector, and then an echo signal received by the ultrasonic detector is acquired. If the amplitude of the echo signal is greater than a threshold amplitude, it is determined that an obstacle is detected. Here, the number of detectors and the installation positions of the vehicles are not limited, it is only required that there is an overlapping area of the detection areas of the at least two detectors. Furthermore, the overlapping areas can be increased by increasing the number of detectors so that more obstacles located in the overlapping areas can be detected.

For example, there is an overlapping area of the detection areas of two or more detectors, and an obstacle is determined in the overlapping area, a coordinate system may be then established. Then, coordinates of the installation positions of the detectors associated with the overlapping area may be calculated, and coordinates of the position of the obstacle are further calculated. By changing the number and the positions of detectors, a plurality of overlapping areas can be obtained, the distribution of obstacles around the vehicle can be optimally identified, so that the vehicle can make reasonable driving plans based on an accurate surrounding obstacle environment.

Figure 2:
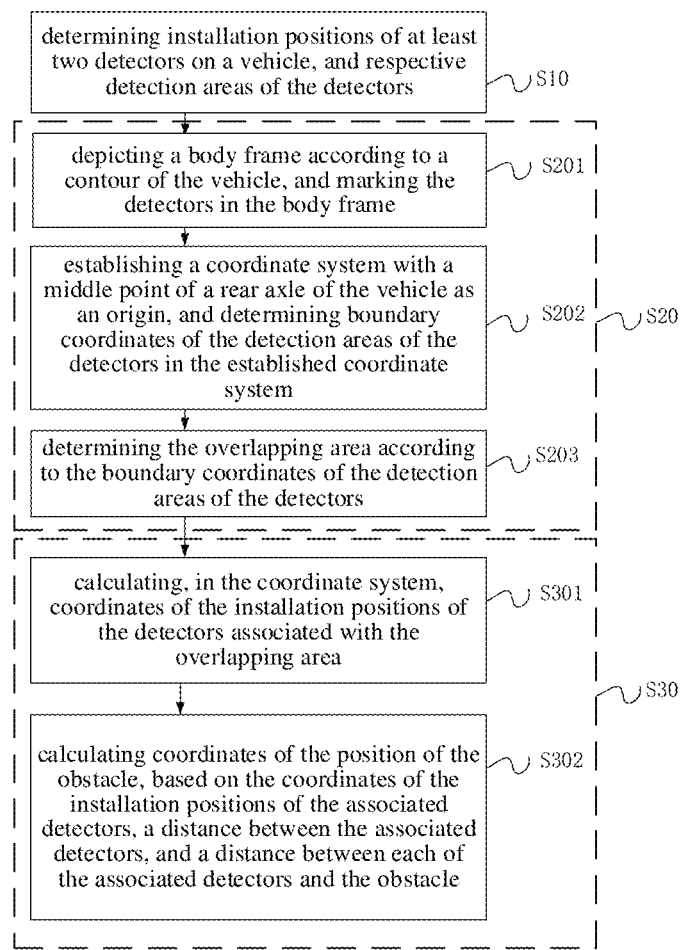
FIG. 2 is a flowchart showing another obstacle positioning method according to an embodiment.

As shown in FIG. 2, in an implementation, the determining an overlapping area of the detection areas of the detectors may include depicting a body frame according to a contour of a vehicle, and marking the detectors in the body frame at S201, establishing a coordinate system with a middle point of a rear axle of the vehicle as an origin, and determining boundary coordinates of the detection areas of the detectors in the established coordinate system at S202, and determining the overlapping area according to the boundary coordinates of the detection areas of the detectors at S203.

Figure 4:
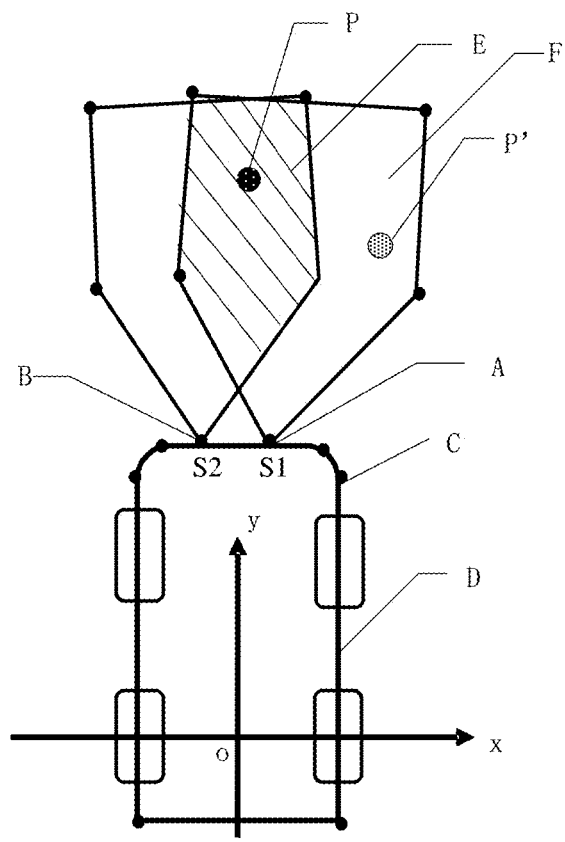
FIG. 4 is a schematic diagram showing an obstacle positioning in an overlapping area and in a non-overlapping area of detectors according to an embodiment.

In an example, by establishing a coordinate system and determining the installation positions of the detectors, the position of the obstacle can be calculated more accurately. In the present embodiment, as shown in FIG. 4, a vehicle frame D is depicted, and the installation position of each detector is marked in the vehicle frame D. The detectors may be installed in different positions, such as at the front of the vehicle, at the rear of the vehicle, at the side of the vehicle, or the like. A coordinate system with a middle point of a rear axle of the vehicle as an origin o is established. A vertical symmetry axis of the vehicle is taken as the vertical axis of the coordinate system, that is, the y-axis. An axis, which is perpendicular to the vertical axis and extends horizontally through the origin o, is taken as the horizontal axis of the coordinate system, that is, the x-axis. The coordinates of the detectors, such as the detector A, the detector B, and the detector C, are marked in the coordinate system. Since the detection area of each detector may be different, it is required to determine the boundary coordinates of the detection areas of the detectors, that is, the coordinates of the envelope diagrams of the detectors, in the established coordinate system. When calculating the coordinates of the envelope diagrams of the detectors, actual detection areas of ultrasonic detectors are usually different from standard detection areas of the ultrasonic detectors due to influences of some key factors, such as the installation positions of the detectors, the length and width, the outline, the rear view mirror of the vehicle and the like, therefore, the boundary coordinates of the detection areas should be calculated based on the actual detection areas. At the end, the overlapping area E is determined according to the boundary coordinates of the detection areas of the detectors, so as to determine whether an obstacle P is located in the overlapping area E, thereby calculating the position of the obstacle P.

As shown in FIG. 2, in an implementation, the determining a position of the obstacle according to the installation positions of the detectors forming the overlapping area may include calculating, in the coordinate system, coordinates of the installation positions of the detectors associated with the overlapping area at S301, and calculating coordinates of the position of the obstacle, based on the coordinates of the installation positions of the associated detectors, a distance between the associated detectors, and a distance between each of the associated detectors and the obstacle at S302.

In an example, the overlapping areas determined according to the above method may be one or more. Further, different overlapping areas may associate with different detectors. Therefore, it is necessary to determine or calculate the coordinates of the installation positions of the detectors associated with the overlapping area in which the obstacle is located. The coordinates of the position of the obstacle is then calculated, based on the coordinates of the installation positions of the associated detectors, a distance between the associated detectors, and a distance between each of the associated detectors and the obstacle. For example, the coordinates of the position of the obstacle P is calculated based on the coordinates of the installation positions of the two detectors, that is, the coordinate S1 of a first detector A and the coordinate S2 of a second detector B, the distance between the two detectors A and B, and the distance between the detector A and the obstacle P. A specific calculation process is omitted herein.

Figure 3:
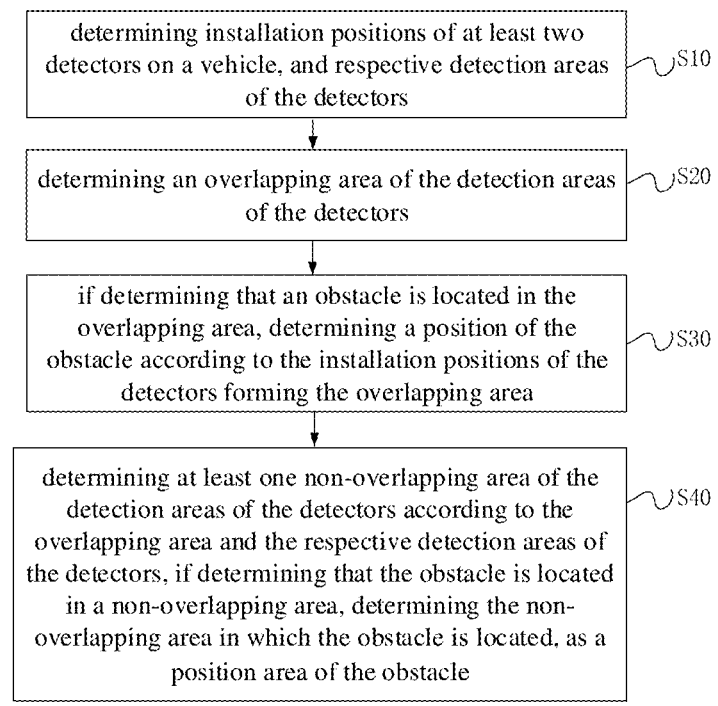
FIG. 3 is a flowchart showing another obstacle positioning method according to an embodiment.

As shown in FIG. 3, in an implementation, the obstacle positioning method may further include determining at least one non-overlapping area of the detection areas of the detectors according to the overlapping area and the detection areas of the detectors, if determining that the obstacle is located in a non-overlapping area, determining the non-overlapping area in which the obstacle is located, as a position area of the obstacle at S40.

As shown in FIG. 4, in an example, the detection areas of certain detectors may include a portion of the overlapping area E and a portion of the overlapping area F. When the obstacle V is located in the non-overlapping area F, only a position area of the obstacle V may be determined according to the size and the shape of the non-overlapping area F.

Embodiment II

Figure 5:
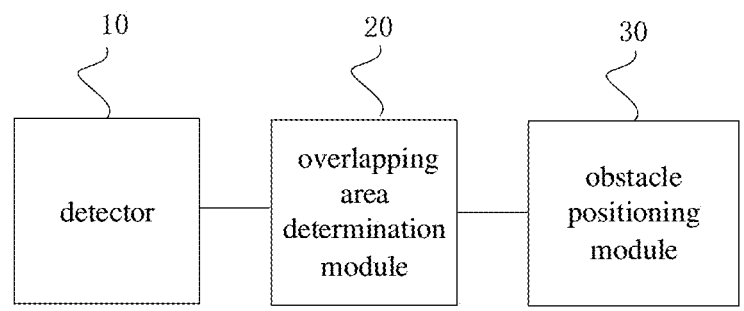
FIG. 5 is a block diagram showing an obstacle positioning device according to an embodiment.

As shown in FIG. 5, in an implementation, an obstacle positioning device is provided. The device may include at least two detectors 10 installed on a vehicle, wherein each detector has a detection area, an overlapping area determination module 20 configured to determine installation positions of the at least two detectors, and respective detection areas of the detectors, and to determine an overlapping area of the detection areas of the detectors, and an obstacle positioning module 30 configured to determine a position of an obstacle according to the installation positions of the detectors forming the overlapping area, if it is determined that the obstacle is located in the overlapping area.

Figure 6:
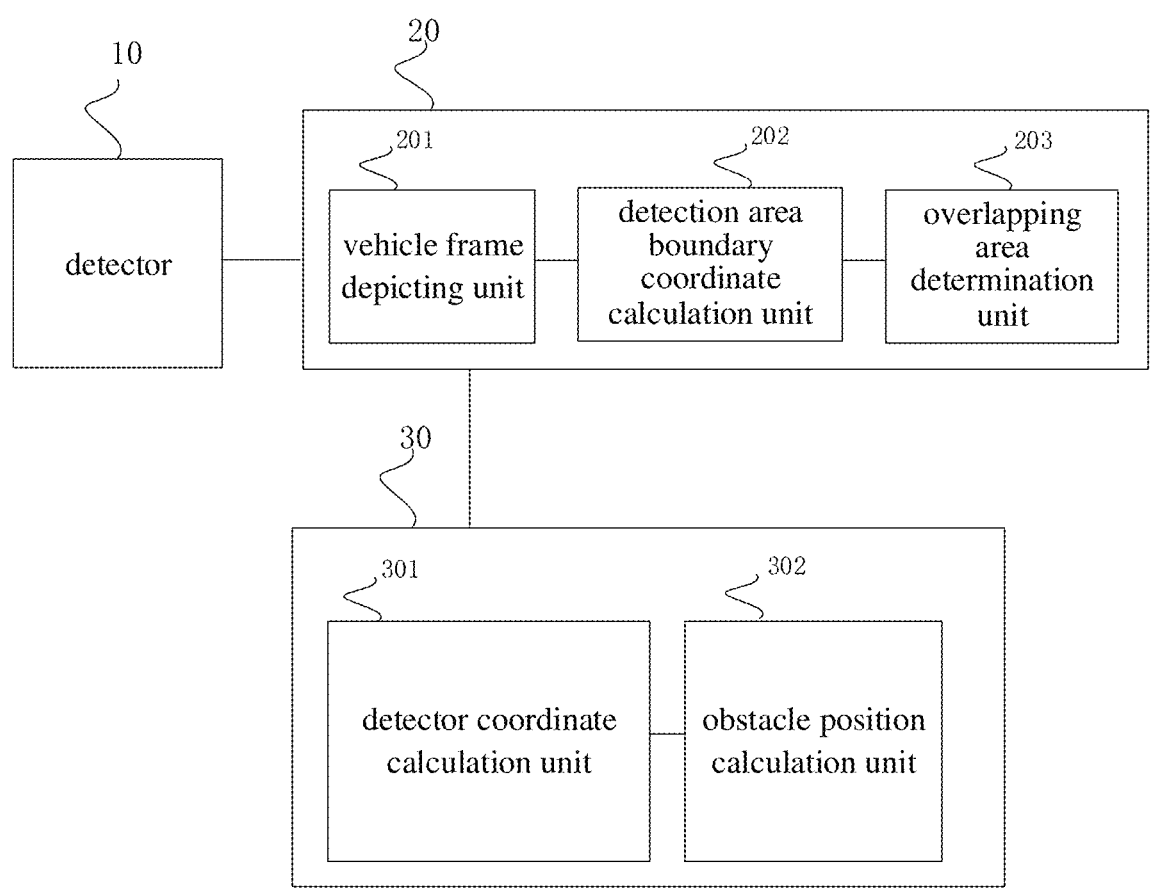
FIG. 6 is a block diagram showing another obstacle positioning device according to an embodiment.

As shown in FIG. 6, in an implementation, the overlapping area determination module 20 may include a vehicle frame depicting unit 201 configured to depict a body frame according to a contour of the vehicle, and mark the detectors in the body frame, a detection area boundary coordinate calculation unit 202 configured to establish a coordinate system with a middle point of a rear axle of the vehicle as an origin, and determine boundary coordinates of the detection areas of the detectors in the established coordinate system, and an overlapping area determination unit 203 configured to determine the overlapping area according to the boundary coordinates of the detection areas of the detectors.

As shown in FIG. 6, in an implementation, the obstacle positioning module 30 may include a detector coordinate calculation unit 301 configured to calculate, in the coordinate system, coordinates of the installation positions of the detectors associated with the overlapping area, and an obstacle position calculation unit 302 configured to calculate coordinates of the position of the obstacle, based on the coordinates of the installation positions of the associated detectors, a distance between the associated detectors, and a distance between each of the detectors and the obstacle.

Figure 7:
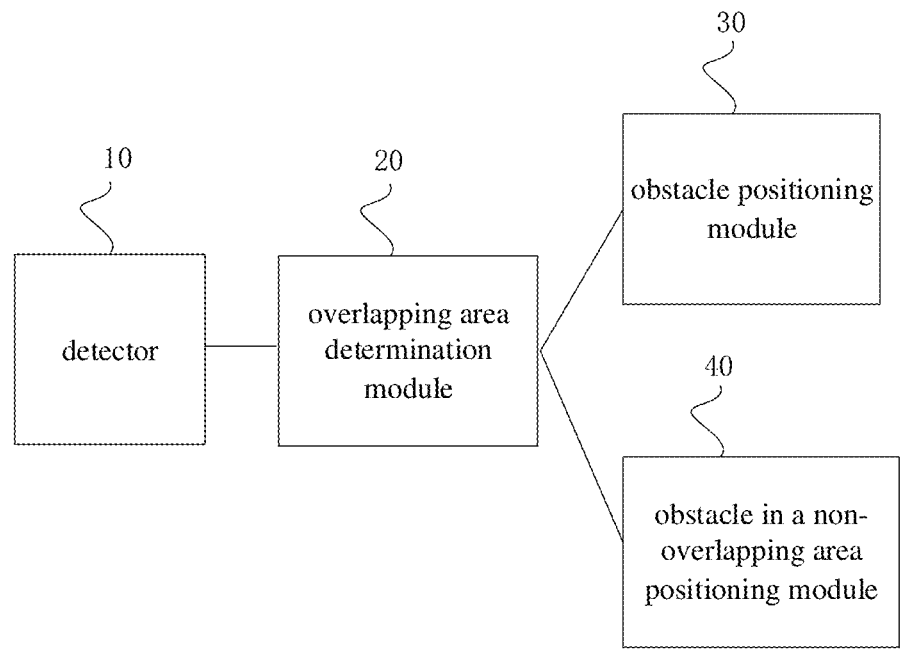
FIG. 7 is a block diagram showing another obstacle positioning device according to an embodiment.

As shown in FIG. 7, in an implementation, the device may further include an obstacle in a non-overlapping area positioning module 40 configured to determine at least one non-overlapping area of the detection areas of the detectors according to the overlapping area and the respective detection areas of the detectors, and if it is determined that the obstacle is located in a non-overlapping area, determine the non-overlapping area in which the obstacle is located, as a position area of the obstacle.

Embodiment III

Figure 8:
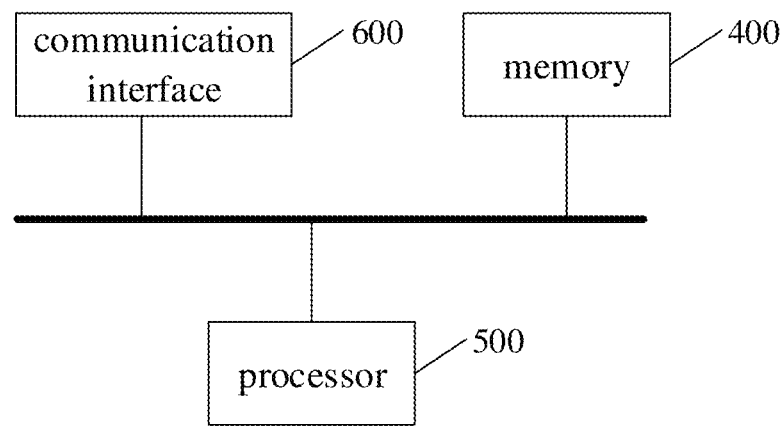
FIG. 8 is a schematic diagram showing an obstacle positioning terminal according to an embodiment.

As shown in FIG. 8, an obstacle positioning terminal is provided according to an embodiment of the present application. The obstacle positioning terminal may include a memory 400 and a processor 500, wherein a computer program that can run on the processor 500 is stored in the memory 400. The processor 500 executes the computer program to implement the obstacle positioning method according to the foregoing embodiments. The number of either the memory 400 or the processor 500 may be one or more.

The terminal may further include a communication interface 600 configured to enable the memory 400 and the processor 500 to communicate with an external device.

The memory 400 may include a high-speed RAM memory and may also include a non-volatile memory, such as at least one magnetic disk memory.

If the memory 400, the processor 500, and the communication interface 600 are implemented independently, the memory 400, the processor 500, and the communication interface 600 may be connected to each other via a bus to realize mutual communication. The bus may be an Industry Standard Architecture (ISA) bus, a Peripheral Component Interconnected (PCI) bus, an Extended Industry Standard Architecture (EISA) bus, or the like. The bus may be categorized into an address bus, a data bus, a control bus, and the like. For ease of illustration, only one bold line is shown in FIG. 8 to represent the bus, but it does not mean that there is only one bus or one type of bus.

Optionally, in a specific implementation, if the memory 400, the processor 500, and the communication interface 600 are integrated on one chip, the memory 400, the processor 500, and the communication interface 600 may implement mutual communication through an internal interface.

Embodiment IV

According to an embodiment, it is provided a computer-readable storage medium having computer programs stored thereon. When executed by a processor, the programs implement the obstacle positioning method described in the Embodiment I.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. An obstacle positioning method, comprising:
determining installation positions of at least two detectors on a vehicle, and respective detection areas of the detectors;
determining an overlapping area of the detection areas of the detectors; and
in a case where determining that an obstacle is located in the overlapping area, establishing a coordinate system, and determining a position of the obstacle according to the installation positions of the detectors forming the overlapping area,
wherein the determining the position of the obstacle according to the installation positions of the detectors forming the overlapping area comprises:
calculating, in the coordinate system, coordinates of the installation positions of the detectors associated with the overlapping area; and
calculating coordinates of the position of the obstacle, based on the coordinates of the installation positions of the associated detectors, a distance between the associated detectors, and a distance between each associated detector of the associated detectors and the obstacle,
wherein the determining the overlapping area of the detection areas of the detectors comprises:
depicting a body frame according to a contour of the vehicle, and marking the detectors in the body frame;
establishing the coordinate system with a middle point of a rear axle of the vehicle as an origin, and determining boundary coordinates of the detection areas of the detectors in the established coordinate system; and
determining the overlapping area according to the boundary coordinates of the detection areas of the detectors.

2. The obstacle positioning method according to claim 1, further comprising:
determining at least one non-overlapping area of the detection areas of the detectors according to the overlapping area and the respective detection areas of the detectors;
in a case where determining that the obstacle is located in a non-overlapping area, determining the non-overlapping area in which the obstacle is located, as a position area of the obstacle.

3. An obstacle positioning device, comprising:
at least two detectors installed on a vehicle, wherein each detector has a detection area;
one or more processors; and
a memory configured for storing one or more programs;
wherein the one or more programs, when executed by the one or more processors, cause the one or more processors to:
determine installation positions of the at least two detectors, and respective detection areas of the detectors, and to determine an overlapping area of the detection areas of the detectors; and
in a case where it is determined that an obstacle is located in the overlapping area, establish a coordinate system, and determine a position of the obstacle according to the installation positions of the detectors forming the overlapping area,
wherein the one or more programs, when executed by the one or more processors, cause the one or more processors further to:
calculate, in the coordinate system, coordinates of the installation positions of the detectors associated with the overlapping area; and
calculate coordinates of the position of the obstacle, based on the coordinates of the installation positions of the associated detectors, a distance between the associated detectors, and a distance between each associated detector of the associated detectors and the obstacle,
wherein the one or more programs, when executed by the one or more processors, cause the one or more processors further to:
depict a body frame according to a contour of the vehicle, and mark the detectors in the body frame;
establish the coordinate system with a middle point of a rear axle of the vehicle as an origin, and determine boundary coordinates of the detection areas of the detectors in the established coordinate system; and
determine the overlapping area according to the boundary coordinates of the detection areas of the detectors.

4. The obstacle positioning device according to claim 3, wherein the one or more programs, when executed by the one or more processors, cause the one or more processors further to:
determine at least one non-overlapping area of the detection areas of the detectors according to the overlapping area and the respective detection areas of the detectors, and in a case where it is determined that the obstacle is located in a non-overlapping area, determine the non-overlapping area in which the obstacle is located, as a position area of the obstacle.

5. A non-transitory computer-readable storage medium, in which a computer program is stored, wherein the computer program, when executed by a processor, causes the processor to:
determine installation positions of the at least two detectors, and respective detection areas of the detectors, and to determine an overlapping area of the detection areas of the detectors; and
in a case where it is determined that an obstacle is located in the overlapping area, establish a coordinate system, and determine a position of the obstacle according to the installation positions of the detectors forming the overlapping area,
wherein the computer program, when executed by the processor, causes the processor further to:
calculate, in the coordinate system, coordinates of the installation positions of the detectors associated with the overlapping area; and
calculate coordinates of the position of the obstacle, based on the coordinates of the installation positions of the associated detectors, a distance between the associated detectors, and a distance between each associated detector of the associated detectors and the obstacle,
wherein the computer program, when executed by the processor, causes the processor further to:
depict a body frame according to a contour of the vehicle, and mark the detectors in the body frame;
establish the coordinate system with a middle point of a rear axle of the vehicle as an origin, and determine boundary coordinates of the detection areas of the detectors in the established coordinate system; and determine the overlapping area according to the boundary coordinates of the detection areas of the detectors.

* * * * *